Figure 7:
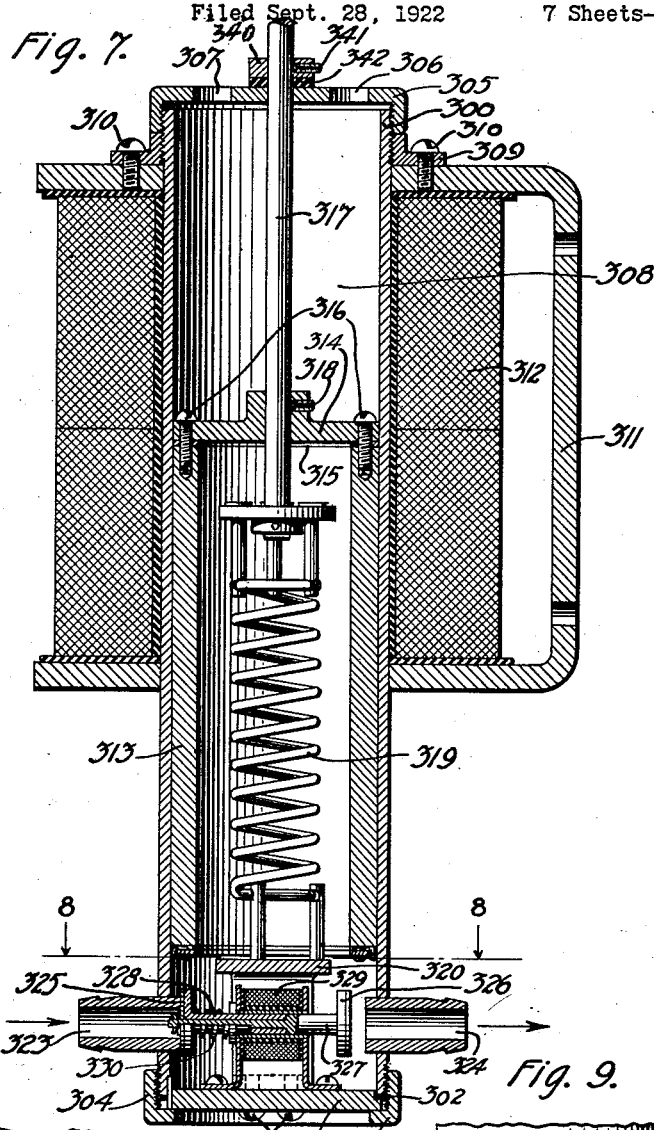

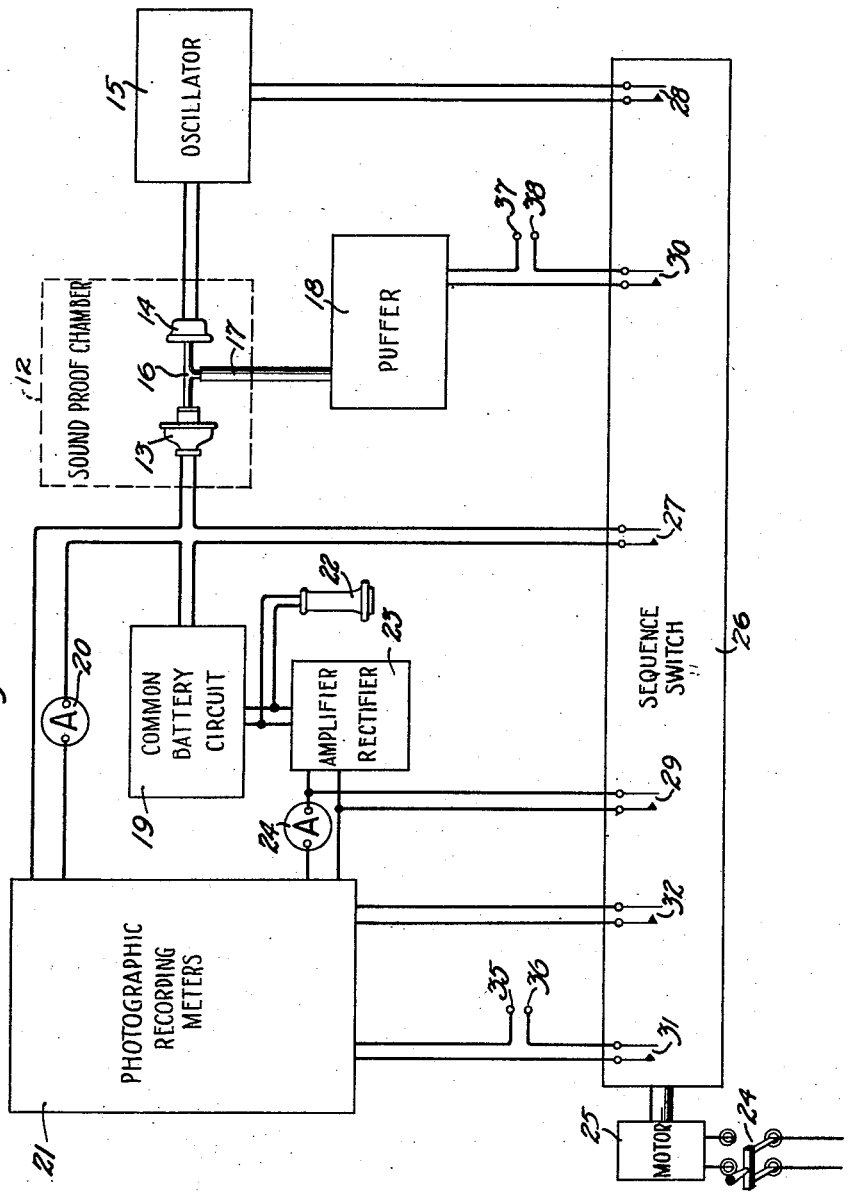

May 5, 1925.
J. T. L. BROWN
TESTING SYSTEM
Filed Sept. 28, 1922
1,536,763
7 Sheets-Sheet 2
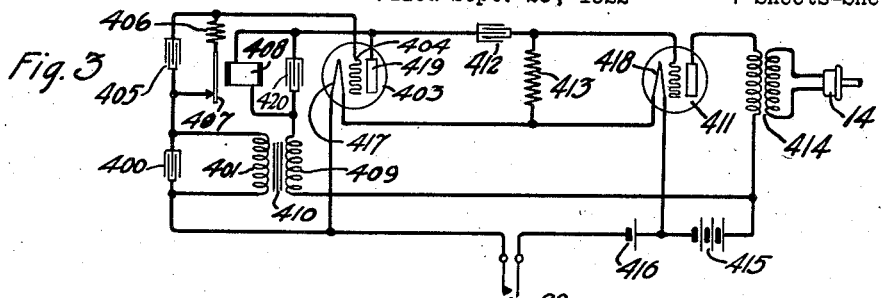
Fig. 3
Fig. 4
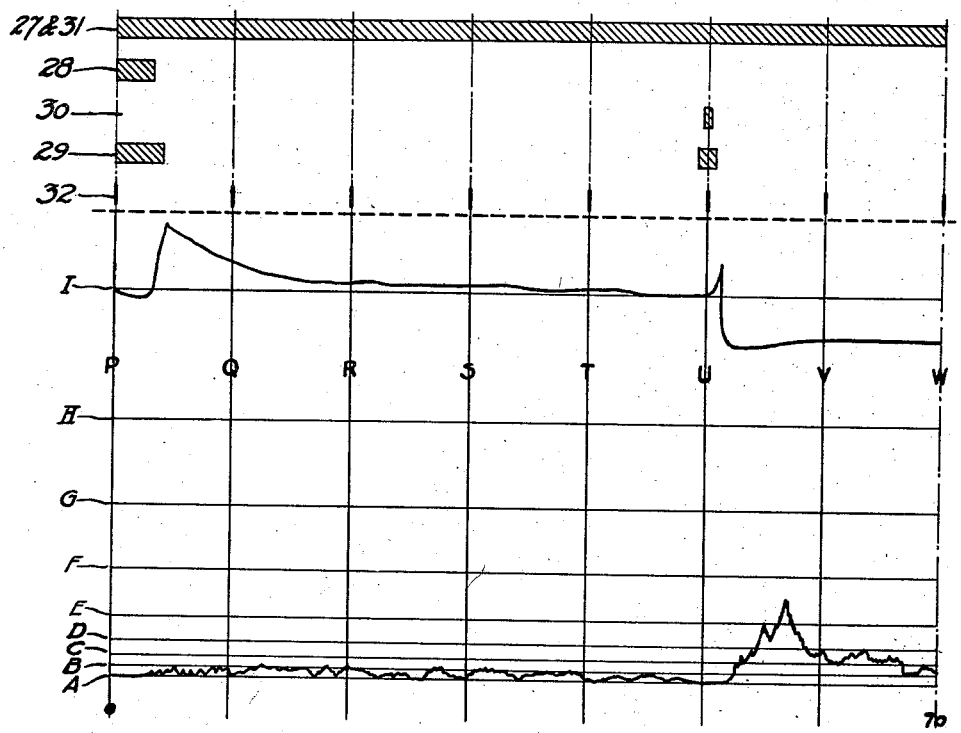
Fig. 2
Inventor
John T. L. Brown
by Joel C. R. Palmer,
Att'y.

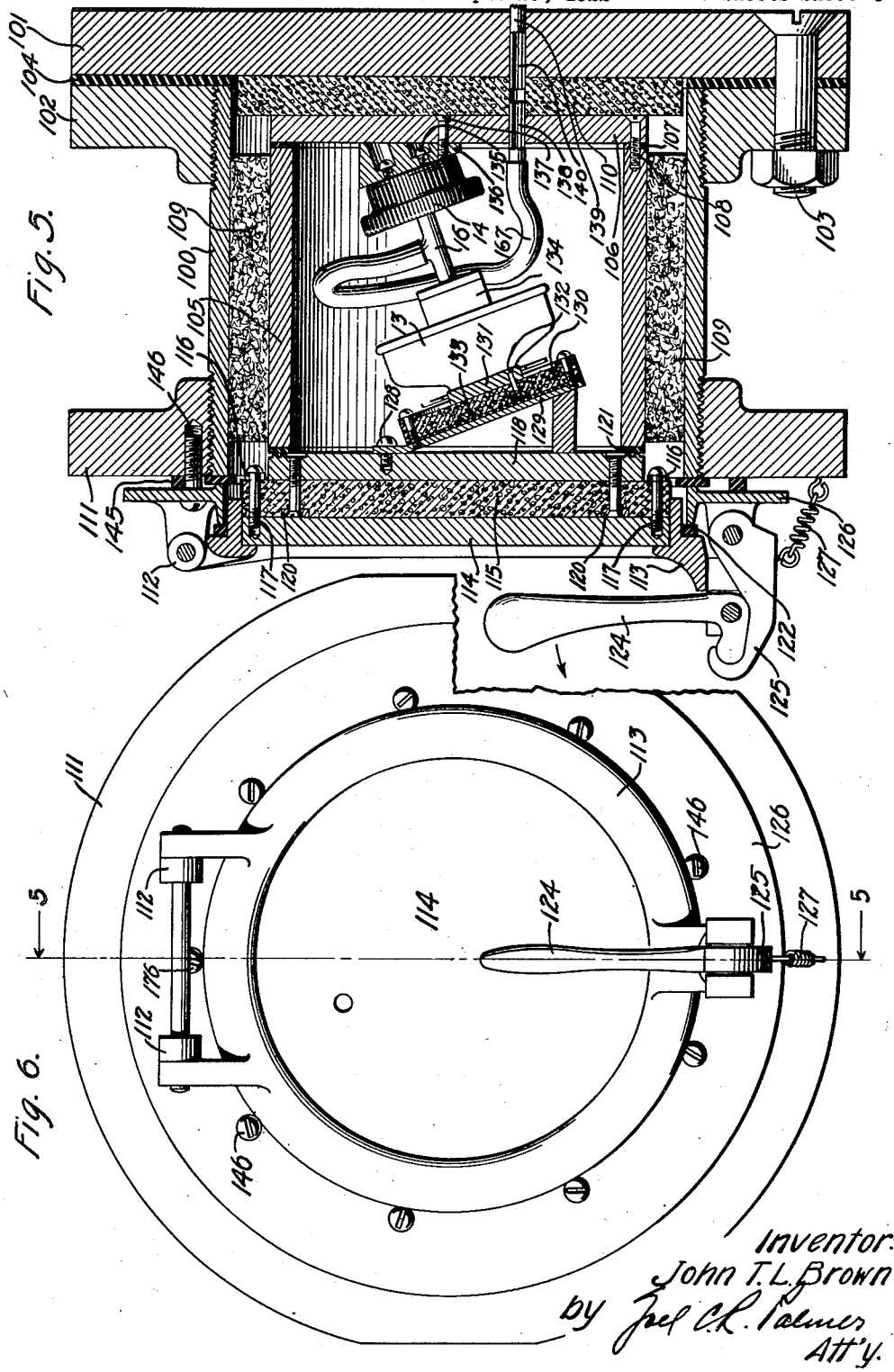

May 5, 1925.

J. T. L. BROWN

TESTING SYSTEM

Filed Sept. 28, 1922

1,536,763

7 Sheets-Sheet 4

Inventor:
John T. L. Brown
by Jas. C. R. Palmer,
Att'y.

May 5, 1925.
J. T. L. BROWN
TESTING SYSTEM
Filed Sept. 28, 1922
1,536,763
7 Sheets-Sheet 7

Inventor:
John T. L. Brown
by Joel C. R. Palmer
Att'y

Patented May 5, 1925.

1,536,763

UNITED STATES PATENT OFFICE.

JOHN T. L. BROWN, OF NEW YORK, N. Y., ASSIGNOR TO WESTERN ELECTRIC COMPANY, INCORPORATED, OF NEW YORK, N. Y., A CORPORATION OF NEW YORK.

TESTING SYSTEM.

Application filed September 28, 1922. Serial No. 591,023.

*To all whom it may concern:*

Be it known that I, JOHN T. L. BROWN, a citizen of the United States, residing at New York, in the county of Bronx, State of New York, have invented certain new and useful Improvements in Testing Systems, of which the following is a full, clear, concise, and exact description.

This invention relates to the testing of microphone transmitters and more particularly to a method of and apparatus for testing microphone transmitters for "burning."

The term "burning" as used in this connection denotes a spontaneous resistance change of the transmitter carbon, evidenced by frying or sputtering noises which may be heard in a connected receiver. As might be supposed, this phenomenon was named "burning" on account of the character of the noise (sputtering, burning etc.) which is heard in a connected receiver when the phenomenon is taking place. This spontaneous change in resistance, like any other change in resistance of the transmitter modulating element, causes the direct current through the transmitter to pulsate. As is well understood in the art, a pulsating direct current may be resolved into two components, one a direct current of constant value, and the other an alternating current. This alternating component which is introduced into the current through the transmitter as a result of the spontaneous resistance change or burning of the transmitter, is called "burning current."

The object of the invention is in general to provide a method and apparatus to facilitate the testing of transmitters for burning and to obtain a permanent record of the test.

A spontaneous resistance change of the transmitter modulating element or burning may take place at any time, and may be especially pronounced following agitation of the modulating element. According to the method of this invention, the transmitter to be tested may be subjected to definite agitating steps following which it is kept free from external influences. The direct current through the transmitter and a desired function of the burning current are measured and recorded. For convenience and accuracy in measuring and recording the desired function of the burning current, an amplifier and a rectifier are used. This permits the use of meters of the direct current type, which are more reliable and accurate than alternating current meters.

In carrying out the above method, the modulating element of the transmitter is subjected to agitation which simulates the agitation that is caused by speech. During a succeeding interval measures of the direct current through the transmitter and the desired function of the burning current are made and recorded while keeping the transmitter free from all external influences. The modulating element is again agitated by delivering a puff of air against it and the above measuring and recording is repeated. By keeping the transmitter free from external influences while the current measurements are being made, there is no resistance change of the carbon due to external influences and hence the results are indications of the spontaneous resistance changes or "burning" of the transmitter.

The mechanism by means of which the steps just enumerated are carried through automatically also constitute a feature of this invention.

More specifically this feature comprises the use of switches of a type well known in automatic telephony, which sequentially control the several operations and mechanisms of the testing apparatus to bring about the desired results.

Figure 8:
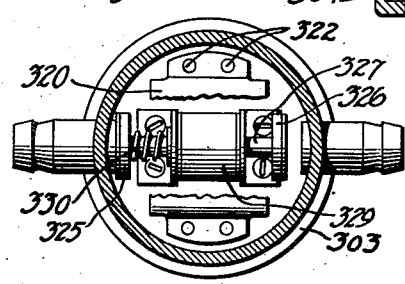
Figure 9:
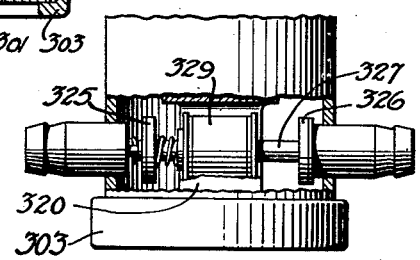
Figure 10:
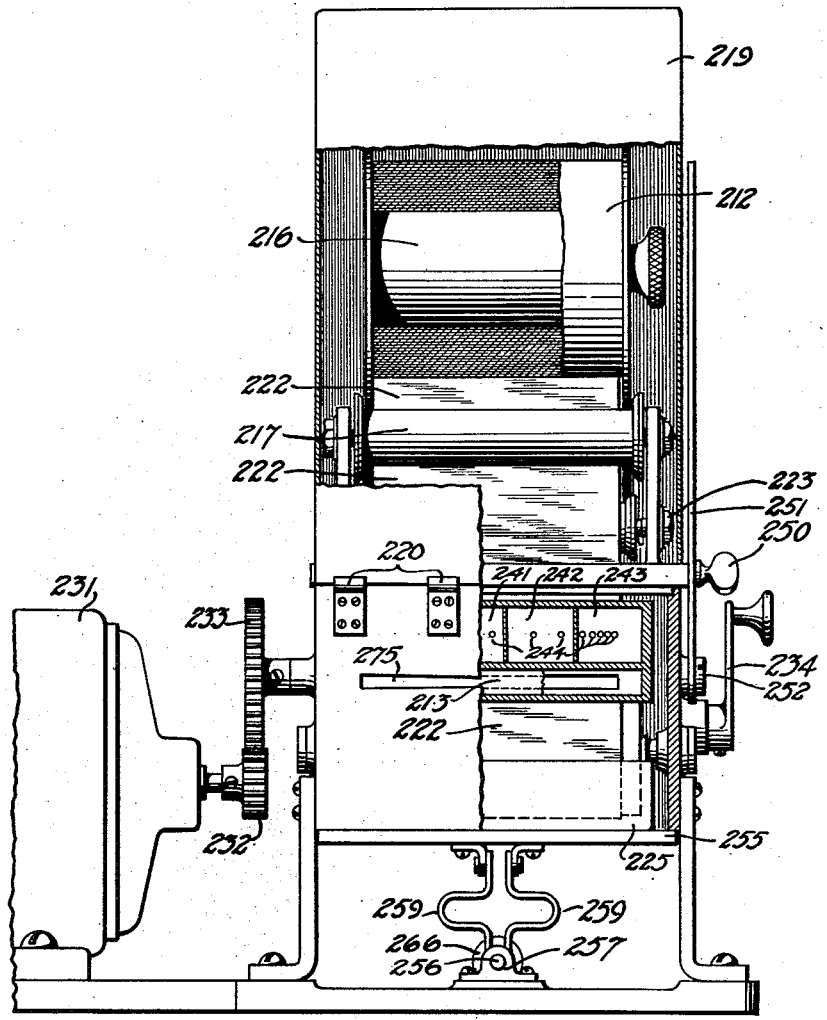
Figure 11:
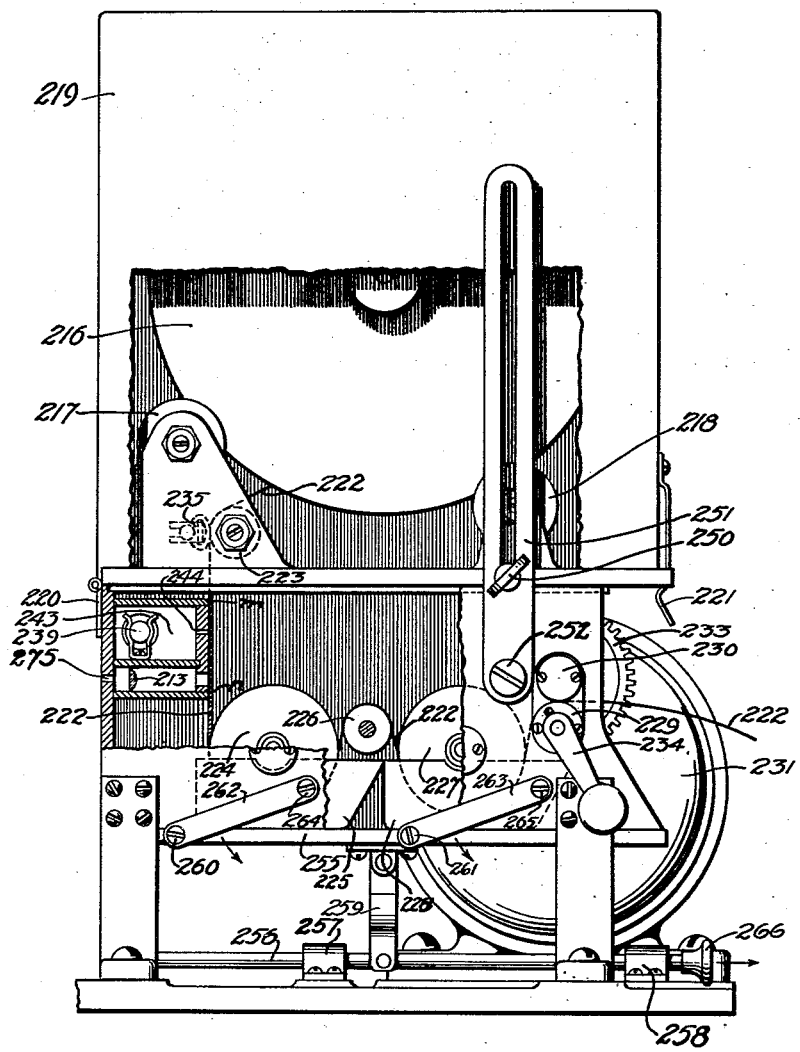
Figure 12:
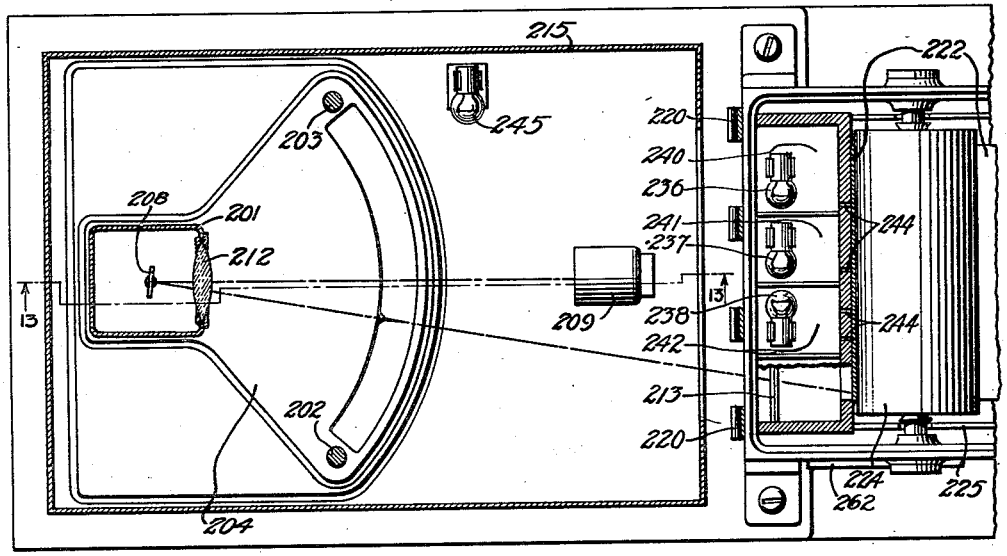
Figure 13:
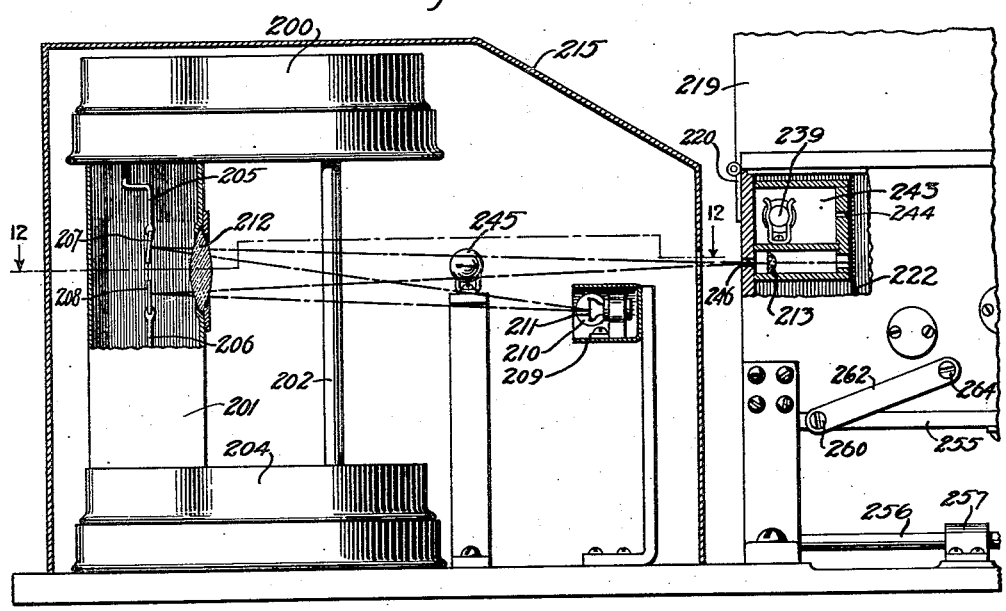

Referring to the drawings, Fig. 1 is a schematic diagram of the apparatus and circuits; Fig. 2 is a schematic diagram showing the sequence and duration of the operations and the corresponding photographic record obtained; Fig. 3 is a schematic diagram of the oscillator; Fig. 4 is an oscillogram of the current output of the oscillator shown in Fig. 3; Fig. 5 is a vertical cross section of the sound proof chamber taken on the lines 5—5 of Fig. 6 and showing in elevation a transmitter in position for testing; Fig. 6 is an elevation of the front of the sound-proof chamber; Fig. 7 is a vertical cross section of the air puffer; Fig. 8 is a horizontal cross section showing the air puffer valve mechanism and taken on the line 8—8 of Fig. 7; Fig. 9 is an elevation of the puffer valve mechanism shown in Fig. 7; Fig. 10 is an end elevation, partially in cross section, of the photographic recording mechanism; Fig. 11 is a side elevation, partially in cross section, of the photographic recording mechanism; Fig. 12 is a horizontal section taken on the line 12—12 of Fig. 13 and showing one of the current meters and a portion of the photographic mechanism; and Fig. 13 is a vertical cross section taken on the line 13—13 of Fig. 12, showing both of the current meters and a portion of the photographic mechanism.

In Fig. 1, 12 is a sound-proof chamber containing a transmitter 13 in position for testing and a receiver 14. Receiver 14, energized by the output of an oscillator 15, produces a sound similar in effect to the human voice, which sound is transmitted to the transmitter 13 by the tube 16 having a branch 17 leading to an air puffer 18. Transmitter 13 is connected into a common battery circuit 19, the details of which are not shown since they are well known in the art and form no part of the present invention. An indicating ammeter 20 and the photographic recording device 21 are connected as shown so as to measure the direct current through the transmitter 13. A receiver 22 is connected so as to be energized by the output of common battery circuit 19 and in parallel with receiver 22 is an amplifier rectifier 23 which may be of any well known type. A small, but definite portion of the A. C. output of the common battery circuit, after being amplified and rectified by 23, is indicated by ammeter 24 and recorded by the photographic recording device 21. Since a definite portion of the A. C. output of the common battery circuit is indicated by meter 24 and recorded by the photographic recording device 21, these two meters may be calibrated to give the entire A. C. output of the common battery circuit. Any source of power suitable for operating the photographic recording device 21 is connected to terminals 35 and 36; and any source suitable for operating the air puffer is connected to terminals 37 and 38.

The operation of the apparatus is as follows: A transmitter having been placed in position for test, switch 24 is closed, setting in operation motor 25 which drives sequence switch 26. As shown by Fig. 2 the sequence switch immediately operates contacts 27 and 31 which complete circuits to transmitter 13 and photographic recording device 21 respectively. These two circuits are maintained throughout the entire test. Contacts 28 are closed for a few seconds, setting oscillator 15 in operation and causing transmitter 13 to be influenced by the output of receiver 14. During this period, contacts 29 are closed so as to short-circuit the output of the amplifier rectifier 23 and protect indicating ammeter 24 and recording meter 21. Following this, there is an interval of about forty-five seconds during which the transmitter is undisturbed and the burning output as well as the direct current through the transmitter are recorded by the photographic recording means 21. Contacts 29 are then closed a second time so as to short-circuit the output of the amplifier rectifier 23 and then contacts 30 are closed, setting in operation puffer 18 which sends a puff of air by way of tubes 17 and 16 to the transmitter 13. There is now a second interval of about 19 seconds during which the transmitter is undisturbed and the output recorded as before.

In Figure 2, the portion above the dotted line is a timing diagram for sequence switch 26, and the portion below the dotted line is the corresponding photographic record obtained for a complete transmitter test having a duration of seventy seconds. The diagram is constructed with time as abscissas. In the sequence switch timing diagram there are five zones each corresponding to one or more elements of the sequence switch as indicated by the numbers at the beginning of each zone. The filled in area of the zones shows the time during which the respective switching elements are held in the operated position. The upper zone corresponds to switching elements 27 and 31 and shows that the common battery circuit and photographic recording device are in operation throughout the entire test. The second zone corresponds to switching element 28 and shows the timing of the oscillator. The third zone corresponds to switching element 30 and shows the timing of the air puffer. The fourth zone corresponds to switching element 29 and shows the time intervals during which the amplifier-rectifier is short-circuited. The fifth zone corresponds to switching element 32 and shows the time at which a lamp is flashed to print the timing lines P, Q, R, S, T, U and W on the photographic record. The lines A, B, C, D, E, F, G, H and I on the photographic record are arbitrary scale lines for reading the current values and are printed in a manner that will be explained later. The irregular line starting near the letter I shows the variation in direct current through the transmitter during the test. The irregular line starting near the letter A, shows the amplified-rectified burning current, or the output of amplifier-rectifier 23.

Oscillator 15 is a band frequency self-blocking oscillator adjusted to give current impulses which have a duration of a few thousandths of a second and are separated by dead intervals of a few thousandths of a second. Circuit details of this oscillator are shown in Fig. 3 and an oscillogram of one pulse of the current output is shown in Fig. 4.

An oscillating circuit comprising a condenser 400 and inductive winding 401 is connected as shown between the grid and filament of thermionic oscillator tube 403. Connected in series with the grid 404 of tube 403 is a condenser 405, and a resistance 406 is connected to relay armature 407 so as to bridge condenser 405 when the relay is in the non-operated position. Connected in the output circuit of tube 403 is relay electromagnet 408 and inductive winding 409, which winding is closely coupled to oscillating winding 401 by means of iron core 410. A condenser 420 in bridge of relay electromagnet 408 provides a path of low impedance to A. C. flowing in winding 409. An amplifying tube 411 is associated with the output circuit of oscillating tube 403 by means of well known resistance capacity coupling comprising condenser 412 and resistance 413. Telephone receiver 14 is associated with the output circuit of tube 411 by means of transformer 414 so that the receiver will be energized by the A. C. output of tube 411. A relatively high voltage battery 415 is connected as shown to supply the plate voltage for both tubes 403 and 411. A relatively low voltage battery 416 controlled by switching element 28 of sequence switch 26 (see Fig. 1) is connected as shown to supply current to the filaments of both tubes.

The operation of the oscillator is as follows:—Upon the closing of contacts 28, filaments 417 and 418 of the vacuum tubes are heated and due to the feed back action between windings 409 and 401, the oscillating circuit comprising condenser 400 and winding 401 is set in oscillation, as is well understood in the art. Simultaneously a direct current flows from battery 415 to winding 409 and thence through the relay electromagnet 408 causing the relay to be operated and break the circuit which shunts condenser 405. With each oscillation of the oscillating circuit comprising condenser 400 a negative charge is placed upon grid 404 as is well understood in the art. The increasing of the negative charge upon grid 404 progressively increases the impedance of the tube to current flowing between anode 419 and filament 417 thereby gradually reducing the value of the current in the output circuit of tube 403 until the point is reached where the energy fed from winding 409 to winding 401 is insufficient to sustain oscillations. This results in the blocking action indicated by Fig. 4. Likewise, direct current through electromagnet 408 diminishes until the electromagnet has insufficient strength to retain armature 407 in the operated position. On dropping back of the armature, the circuit in bridge of condenser 405 is reformed, allowing the negative charge to escape from grid 404. This brings the circuit back to the initial condition and it immediately functions again to produce a current pulse such as shown in Fig. 4. Tube 411 merely serves to amplify the current pulses produced by tube 403 and hence cause a pulse of greater energy to be delivered to receiver 14 as will be readily understood by those skilled in the art.

Due to the close coupling between the plate and grid circuits, the frequency of oscillation increases as the plate current decreases. This is illustrated in Fig. 4 which is a reproduction of an oscillogram showing one pulse of current delivered to receiver 14. By holding relay contact 407 closed and applying the proper D. C. potentials between the grid and filament, single frequency tones over a range of three musical octaves have been produced with this same circuit.

The sound proof chamber 12 is shown in Figs. 5 and 6 as made from standard large diameter pipes and standard flanged fittings, and consists essentially of two concentric cylindrical chambers completely separated from each other by non-rigid material, such as felt or sponge rubber.

A section of large diameter pipe 100 is closed at one end by a plate 101 secured to a flanged fitting 102 by bolts, such as 103, only one of which is shown. A gasket 104 serves to produce a tight joint. Within the chamber thus formed is a second chamber formed from a section of pipe 105 closed at one end by a plate 106 held against a gasket 107 by means of screws 108. Felt 109 and sponge rubber 110 separate the inner chamber from the outer one. On the other end of pipe 100 is a second flanged fitting 111, which supports an annular member 126 held against gasket 145 by screws 146. Hinged at 112 is a composite door that serves to simultaneously close both the inner and outer chambers. The door consists of an annular member 113 closed by plate 114 to which is fastened a slab of sponge rubber 115 by means of a flat ring 116 and screws 117. Secured to the slab of sponge rubber 115 is a plate 118 held by means of screws which pass through the slab of sponge rubber and have their heads sunk in a ring 120. With the doors in the closed position, plate 118 bears against gasket 121 closing the inner chamber and annular member 113 bears against gasket 122 closing the outer chamber. It will thus be seen that closing the door forms two complete chambers between which there is no rigid connection.

The door may be held closed by means of a latch consisting of a member 124 attached to the door and which cooperates with the member 125 pivotally secured to 126. A retractile spring 127 serves to draw member 125 out of the way when it is released by rotating member 124 in the direction indicated by the arrow.

Secured to plate 118 by screws 128 is a plate 129 faced with a slab of sponge rubber 130. Secured to the slab of sponge rubber is a plate 131 held in place by means of screws 132 which are secured into threaded holes in a ring 133. The transmitter 13 to be tested is secured to plate 131 in any suitable manner so that when the door is closed, the transmitter is brought up against a hollow rubber element 134, attached to the end of tube 16 leading from the receiver 14 which is energized by the output of oscillator 15. Receiver 14 is mounted, as shown, by means of screws 135 which cooperate with the member 136 secured to plate 106 by means of screws, such as 137. Fixed in plate 106 is a short metallic tube 138 and fixed in plate 101 is a similar tube 139. These two tubes are connected by a rubber tube 140 and serve to conduct air from puffer 18 into the inner chamber. A rubber tube 167 conducts the blast of air from 138 to tube 16 from which it is delivered against the transmitter 13.

The air puffer 18 is shown in detail in Figs. 7, 8 and 9 and consists essentially of a solenoidally operated pump adapted to supply a single puff of air during the test of a transmitter. A non-magnetic pump cylinder 300 is closed at the lower end by plate 301 held against gasket 302 by the flange 303 on the female member 304. The upper end is closed by a cap 305 in which are holes 306 and 307 to relieve the pressure in the space 308 above the piston. Secured to the pump cylinder by means of the flanged element 309 and screws 310 is a magnetic member 311 of the form shown. Contained within this magnetic member 311 and surrounding the upper end of the pump cylinder 300 is a strong solenoid 312. The piston consists of a hollow magnetic cylinder 313 closed at the upper end by member 314 held against gasket 315 by screws 316. A guide rod 317 is secured to 314 by set screw 318 and is attached by any suitable means to a retractile spring 319 which in turn is secured by any suitable means to a member 320 fastened to the bottom of the pump cylinder by means of screws 322. The pump cylinder is provided with an intake port 323 and an outlet port 324 which have cooperating with them valves 325 and 326 respectively. These valves are fixed upon a composite stem consisting of a non-magnetic section 327 and a magnetic section 328 which pass through a solenoid 329. A spring 330 serves to normally keep the inlet 323 closed by valve 325. When a puff of air is required, solenoids 312 and 329 are simultaneously energized for an instant by the action of the sequence switch 26. Solenoid 329 throws valve 326 against the outlet 324 and permits air to be drawn in to the intake port 323. Piston 313 is elevated by solenoid 312 thereby filling the lower portion of the chamber of the pump cylinder with air. When the solenoids are deenergized, spring 328 causes valve 325 to close the intake port 323 and valve 326 to open the outlet port 324. Spring 319 draws the piston down and causes a puff of air to be delivered through port 324. Downward motion of the piston is arrested by means of a collar 340 secured to the upper end of guide rod 317 by means of a set screw 341. This collar comes in contact with a resilient washer 342. The photographic recording means shown in Figs. 10, 11, 12 and 13 consists essentially of two sensitive standard D. C. ammeters, each provided with a moving mirror to reflect a beam of light through a slit to a strip of sensitized paper which is moved past the slit at uniform speed and then passed through a developing and fixing bath.

A standard ammeter 200 is supported by members 201, 202 and 203 above a similar standard ammeter 204. Fastened to the moving systems of the ammeters are light aluminum members 205 and 206 carrying small mirrors 207 and 208 respectively which receive light through a hole (not shown) in the case 209 which encloses an electric lamp 210. Lamp 210 has a single vertical filament, the light from which is focussed by spherical lens 212 and cylindrical lens 213 upon a strip of sensitized paper 222. Cylindrical lens 213 is as long as the paper is wide and serves to distort the image of filament 211 so that it becomes only a minute spot of light.

The meters are enclosed by a cover 215 which is light tight except for a slit through which the light beams pass to the sensitized paper. A quantity of sensitized paper is wound upon a metallic spool 216 which is rotatably supported by rollers 217 and 218. These rollers are slightly wider than spool 216 and are provided with flanges, as shown, to hold the spool in position. Spool 216 is enclosed by a light tight cover 219 which is hinged, as shown, at 220 and provided with a catch 221. Attached to 219 is a thumb screw 250 which cooperates with the slot in element 251 which is hinged at 252 to the lower part of the frame work. This set screw serves to hold the cover 219 in an elevated position while renewing spool 216.

The strip of sensitized paper 222 is drawn from spool 216, passes over roller 223, is exposed between points m and n, passes under roller 224, is developed by a solution in the tray 225, passes over roller 226, under roller 227, is fixed by a solution in the tray 228 and passes out between rollers 229 and 230. Rollers 224, 226, 227, 229 and 230, are made from suitable material such as rubber.

A motor 231 is operatively connected to roller 230 in any suitable manner such as by gears 232 and 233. The motor rotates roller 230 at uniform speed thereby causing the strip of paper 222 to be advanced at a uniform rate. Attached to roller 229 is a crank 234 by means of which the paper may be manually advanced as desired. A felt covered member 235 presses against the paper where it passes over roller 223 so as to keep the strip taut between this point and the rollers 229 and 230.

An arbitrary irregular scale is automatically printed on the sensitized paper by the action of light from four electric lamps 236, 237, 238 and 239 contained in compartments 240, 241, 242 and 243 respectively. The light shines upon the paper through pin holes 244, producing the scale shown by the lines A, B, C, D, E, F, G, H and I in Fig. 2. The lines P, Q, R, S, T, U, V and W in Fig. 2 represent ten second intervals and are obtained by light from lamp 245 which is automatically flashed by contacts 32 of sequence switch 26. This light passes through slit 246 and prints a line the full width of the sensitized paper.

Trays 225 and 228 are supported upon shelf 255 which may be lowered to permit their removal. A rod 256 is movable in slideways 257 and 258 and has hinged to it, as shown, elements 259 which are also hinged as shown to the bottom of shelf 255. Attached to shelf 255 by screws such as 260 and 261 are links such as 262 and 263 which are also attached, as shown, to the frame work by screws 264 and 265 respectively. It is apparent that when rod 256 is moved in a direction indicated by the arrow by pulling upon knob 266, the links 262 and 263 will move in the direction indicated by the arrows and thus the shelf 255 will be lowered, giving access to the trays 225 and 228.

The meters are arranged so that for large deflections light is thrown upon the sensitized paper through the left end of slot 275 shown in Fig. 10. In practice, it has been found that the current fluctuates more rapidly at large scale deflections than at small scale deflections and consequently if the light thrown upon the sensitized paper were of the same intensity for all deflections, the exposure of the paper would be inadequate at high current values. Therefore, slot 275 is made tapered as shown in Fig. 10 so that its left end is wider than the right end thereby permitting more light to pass to cylindrical lens 213 and causing the spot of light projected upon the paper to be more intense.

The burning current has been defined as the alternating current component introduced into the current through the transmitter by a spontaneous resistance change of the transmitter. However, the burning current itself is not of direct interest. The thing of direct interest, is the effect which this current will have upon the subscriber's receiver at the other end of the line. Obviously this is a function of the burning current itself, but the effect which will be felt at the subscriber's receiver is not equal to the burning current on account of the attenuation which takes place in the connecting circuit. For this reason the common battery circuit is inserted between the transmitter being tested and the receiver 22. The amplifier rectifier which delivers the current indicated by meter 24 and recorded by the photographic recording meters is connected directly in bridge of receiver 22, and hence the indication of meter 24, and the corresponding photographic record obtained gives the desired function of the burning current which is the effect produced at receiver 22 by the burning current.

What is claimed is:

1. The method of testing a microphonic transmitter which comprises placing the transmitter in a circuit, agitating the modulating element of the transmitter for an interval, and during a succeeding interval amplifying, rectifying and permanently recording a function of the burning current.

2. The method of testing a microphonic transmitter which comprises placing the transmitter in a circuit, agitating the modulating element of the transmitter for an interval, and during a succeeding interval permanently recording a function of the burning current.

3. The method of testing a microphonic transmitter which comprises placing the transmitter in a circuit, agitating the modulating element of the transmitter and during a succeeding interval permanently recording the direct current through the transmitter and amplifying, rectifying and permanently recording a function of the burning current.

4. A microphonic transmitter testing apparatus comprising, an operating circuit arranged to include the transmitter to be tested; means for agitating the transmitter carbon; means for amplifying, rectifying and permanently recording the burning current; and means for controlling the sequence and duration of the operation of said means for agitating the transmitter carbon, and said means for amplifying, rectifying and permanently recording a function of the burning current.

5. A microphonic transmitter testing apparatus comprising, an operating circuit arranged to include the transmitter to be tested; means for agitating the transmitter carbon; means for permanently recording the direct current through the transmitter; means for amplifying, rectifying, and permanently recording the burning current; and means for controlling the sequence of operation of said means for agitating the transmitter carbon, said means for permanently recording said direct current, and said means for amplifying, rectifying, and permanently recording a function of the burning current.

6. The method of testing a microphonic transmitter which comprises placing the transmitter in an operating circuit and amplifying, rectifying and permanently recording a function of the burning current.

7. The method of testing a microphonic transmitter which comprises placing the transmitter in an operating circuit, agitating the modulating element of the transmitter for an interval, and during a succeeding interval indicating a function of the burning current.

8. A microphonic transmitter testing apparatus comprising an operating circuit arranged to include the transmitter to be tested, means for agitating the transmitter carbon, means for amplifying and indicating a function of the burning current, and means for controlling the sequence and duration of the operation of the said means for agitating the transmitter carbon and said means for amplifying and indicating a function of the burning current.

9. The method of testing a microphone transmitter which consists in placing the transmitter in a circuit, agitating the modulating element of the transmitter for an interval, and during a succeeding interval amplifying a portion of the alternating current component of the pulsating direct current occurring during said succeeding interval, rectifying said alternating current, and making a permanent record of the resultant direct current.

In witness whereof, I hereunto subscribe my name this 26th day of September A. D., 1922.

JOHN T. L. BROWN.